US012129994B1

(12) United States Patent
Yang

(10) Patent No.: US 12,129,994 B1
(45) Date of Patent: Oct. 29, 2024

(54) LED CHRISTMAS LIGHT

(71) Applicant: Ping Yang, Dongguan (CN)

(72) Inventor: Ping Yang, Dongguan (CN)

( * ) Notice: Subject to any disclaimer, the term of this patent is extended or adjusted under 35 U.S.C. 154(b) by 0 days.

(21) Appl. No.: 18/667,028

(22) Filed: May 17, 2024

(51) Int. Cl.

| | |
|---|---|
| ***F21V 23/00*** | (2015.01) |
| ***F21K 9/232*** | (2016.01) |
| ***F21K 9/69*** | (2016.01) |
| ***F21V 9/40*** | (2018.01) |
| ***F21V 17/10*** | (2006.01) |
| ***F21V 29/71*** | (2015.01) |
| *F21W 121/04* | (2006.01) |
| *F21Y 115/10* | (2016.01) |

(52) U.S. Cl.
CPC ............ *F21V 23/001* (2013.01); *F21K 9/232* (2016.08); *F21K 9/69* (2016.08); *F21V 9/40* (2018.02); *F21V 17/104* (2013.01); *F21V 29/71* (2015.01); *F21W 2121/04* (2013.01); *F21Y 2115/10* (2016.08)

(58) Field of Classification Search
CPC ........ F21V 23/001; F21V 9/40; F21V 17/104; F21V 29/71; F21K 9/232; F21K 9/69; F21Y 2115/10
See application file for complete search history.

(56) References Cited

U.S. PATENT DOCUMENTS

| | | | | |
|---|---|---|---|---|
| 10,295,162 | B2 * | 5/2019 | Habchi | F21V 17/06 |
| 2009/0251923 | A1 * | 10/2009 | Yu | F21V 31/005 362/653 |
| 2014/0103794 | A1 * | 4/2014 | Ueda | F21V 23/002 313/318.01 |
| 2018/0080611 | A1 * | 3/2018 | Haberkorn | F21K 9/232 |
| 2023/0265977 | A1 * | 8/2023 | Jiang | H05B 45/00 362/249.02 |
| 2024/0159366 | A1 * | 5/2024 | Huang | F21S 9/02 |

FOREIGN PATENT DOCUMENTS

CN 219160158 U 6/2023

* cited by examiner

*Primary Examiner* — Evan P Dzierzynski
(74) *Attorney, Agent, or Firm* — Birch, Stewart, Kolasch & Birch, LLP

(57) ABSTRACT

The present invention discloses a Christmas LED light comprising a lens having an LED light inside the lens, and the LED light having a positive lead and a negative lead fixed on a bottom surface of the LED light; a sealing block is bonded to a bottom of the lens, and lower ends of the positive lead and negative lead each penetrating through the sealing block to reach beyond a bottom of the sealing block; the positive lead and negative lead each are bent to form a bending angle A near the LED light, and light emitted from a light-emitting surface of the LED light illuminates toward a top of the lens to avoid light shadows, and two LED chips in a cavity are reverse-parallel connected to the positive lead and negative lead, so that regardless of the polarity of the external power supply, one of the two LED chips emits light.

10 Claims, 6 Drawing Sheets

LED CHRISTMAS LIGHT

BACKGROUND OF THE INVENTION

1. Field of the Invention

The present invention relates to a technical field of light emitting diode (LED) lights, and especially to an LED Christmas light.

2. Description of the Related Art

Nowadays, as people pay more attention to Christmas, people like to set up on a roof or a wall with an entire mesh of fancy Christmas light strings, and when the night falls, the Christmas light strings show flashing lighting, adding to the beauty and joyfulness of homes.

For example, a prior art "Christmas LED light," allocated with a published number CN219160158U, is an invention. The prior art recites that through Dumet wires and lens sealing, an LED chip is disposed inside a lens, and relative to tungsten filaments, the LED chip is more energy efficient and environment friendly, and the lens made of glass has better light transmittance to avoid any plastic aging issue, and an integrated piece of a lens and a Dumet wire sealing is superior in preventing dust and water from entering the LED chip.

However, the above prior art has the following problems: the aforesaid LED chip emits light sideward, therefore leading to a situation that light is emitted from one side of the LED chip while no light is emitted from the other side of the LED chip, which produces a shadow; furthermore the light emitted is not uniform and therefore not so aesthetically appealing; accordingly, a purpose of the present invention is to provide a Christmas LED light without the shadow and with a high assembly productivity.

SUMMARY OF THE INVENTION

In view of the above-mentioned, the present invention provides a Christmas LED light wherein by bending upper portions of two leads, light emitted from an LED light (2) illuminates uniformly on a light-emitting surface of a top of a lens (6) to avoid generating a shadow; and two LED chips are reverse-parallel connected to form a positive lead and a negative lead in the LED light so that regardless of polarity of an external power supply connected to the positive lead and the negative lead, one of the two reverse-parallel connected LED chips emits light, thereby reducing difficulties of assembly and improving productivity of the Christmas LED light, and thereby the problems in the prior art are solved.

In order to achieve the above-mentioned, the present invention provides the following technical solution:

a Christmas LED light, comprising a lens having an LED light inside the lens, and the LED light having a positive lead and a negative lead both fixed on a bottom surface of the LED light; a sealing block is fixedly bonded to a bottom of the lens, and lower ends of the positive lead and the negative lead each penetrating through the sealing block from top to bottom;

the positive lead and the negative lead each bent to form a bending angle near the LED light and the LED light including a light-emitting surface which illuminates toward a top of the lens;

the LED light having a cavity inside, and the cavity accommodating a first LED chip and a second LED chip inside, wherein the two of the first LED chip and the second LED chip are reverse-parallel connected, and the connected first LED chip and the second LED chip have two terminals each fixed to the positive lead and the negative lead.

Preferably, the Christmas LED light of the present invention further has a central axis from the top of the lens to the bottom of the sealing block, wherein, the positive lead and the negative lead each extend beyond the bottom surface of the LED light from a first contact point and a second contact point on the bottom surface of the LED light, and a direction of a connection line between the first contact point and the second contact point is perpendicular to a direction of the central axis of the Christmas LED light.

Preferably, the bending angle of both the positive lead and the negative lead is both from 70° to 85°.

Preferably, at a top of the sealing block there are a third contact point and a fourth contact point, and the positive lead passes through the third contact point, the negative lead passes through the fourth contact point, and the third contact point and the fourth contact point are symmetrically disposed relative to the central axis; such that short circuit between the positive lead and the negative lead is avoided, and, in addition, when the Christmas LED light is assembled, a relative rotation between the sealing block and the lens does not affect an appearance of the emitted light.

Preferably, at a top of the sealing block, a ring insert is fixed thereto, and a ring groove matching the ring insert is provided on a bottom end surface of the lens, and the ring insert is inserted in the ring groove to improve the firmness between the sealing block and the lens, and to prevent the ring insert from rotating in the ring groove.

Preferably, the ring insert is provided with a respective limit block on each of two sidewalls of the ring insert, and the ring groove is provided with a respective limit slot matching the limit block, on each of two inner sidewalls of the ring groove, wherein the limit block is inserted in the limit slot. The limit block and the limit slot are cooperated to prevent the ring insert from rotating.

Preferably, the sealing block is fixedly penetrated through by a plurality of metal thermal blocks from the bottom of the sealing block and into a space inside the lens, and the plurality of metal thermal blocks are interspersed with the positive lead and the negative lead to conduct heat in the lens to an exterior of the lens for heat dissipation.

Preferably, an annular recess is provided at an upper section of an outer wall of the lens, and a color paper is attached in the annular recess, and a color of the light emitted from the Christmas LED light is changeable by replacing the color paper with a color paper of a different color.

Preferably, the color paper is glued to the annular recess to facilitate replacing the colored paper.

Preferably, a light diffusion layer is provided on top of the light-emitting surface of the LED light to enhance light diffusion.

Technical Effects and Merits of the Present Invention:

1. In the present invention, through bending upper portions of the two leads, light emitted from the LED light illuminates uniformly on the light-emitting surface of the top of the lens to avoid generating a shadow; and two LED chips are reverse-parallel connected with the positive lead and the negative lead in the cavity of the LED light, such that, regardless of the polarity of the external power supply connected to the positive lead and the negative lead, one of the two LED chips emits light, thereby reducing difficulties of assembly and improving productivity of the Christmas LED light.

2. The deployment of the two limit blocks can effectively prevent the rotation of the sealing block, thereby ensuring that the LED light, the positive lead and the negative lead all remain in the same position. Multiple metal thermal blocks can conduct heat in the lens to the exterior of the lens for heat dissipation. The color paper attached in the annular recess can produce various color lights to enhance the Christmas atmosphere.

In order to make the above objects, features and advantages of the present invention more apparent and easier to understand, the following embodiments, together with the accompanying drawings, are described in detail as follows.

DETAILED DESCRIPTION OF THE INVENTION

The technical solution of the present invention is further described below in conjunction with the accompanying drawings and by means of specific embodiments. In the description of the present invention, it is to be understood that the terms “center”, “longitudinal”, “lateral”, “length”, “width”, “thickness”, “top”, “bottom”, “left”, “right”, “vertical”, “horizontal”, “top”, “bottom”, “inner”, “outer”, “axial”, “radial”, “circumferential” and the like indicate orientation or positional relationships based on those shown in the accompanying drawings, and are intended only to facilitate the description of the present invention and to simplify the description, and are not intended to indicate or imply that the device or element referred to must have a particular orientation, or be constructed and operated in a particular orientation and therefore cannot be construed as limitations of the present invention.

Furthermore, the terms “first” and “second” are used for descriptive purposes only and are not to be understood as indicating or implying relative importance or implicitly specifying the number of technical features indicated. Thus, the feature defined with “first”, “second” may include one or more such features, either explicitly or implicitly. In the description of the present invention, unless otherwise specified, “more than one” means two or more.

In the description of the present invention, it is to be noted that, unless otherwise expressly specified and limited, the terms “mounted”, “connected”, and “connecting” are to be understood in a broad sense. For example, it may be a fixed connection, a removable connection, or a connection in one piece; it may be a direct connection, an indirect connection through an intermediate medium, or a connection within two elements. For a person of ordinary skill in the art, the specific meaning of the above terms in the present invention may be understood in a specific context.

The technical solutions in the embodiments of the present invention will be clearly and completely described below in conjunction with reference to the accompanying drawings in the embodiments of the present invention, and it is clear that the described embodiments are only part of the embodiments of the present invention, not all implementations. Based on the embodiments of the present invention, all other embodiments obtained by those of ordinary skill in the art without creative efforts are within the scope of protection of the present invention.

Figure 1:
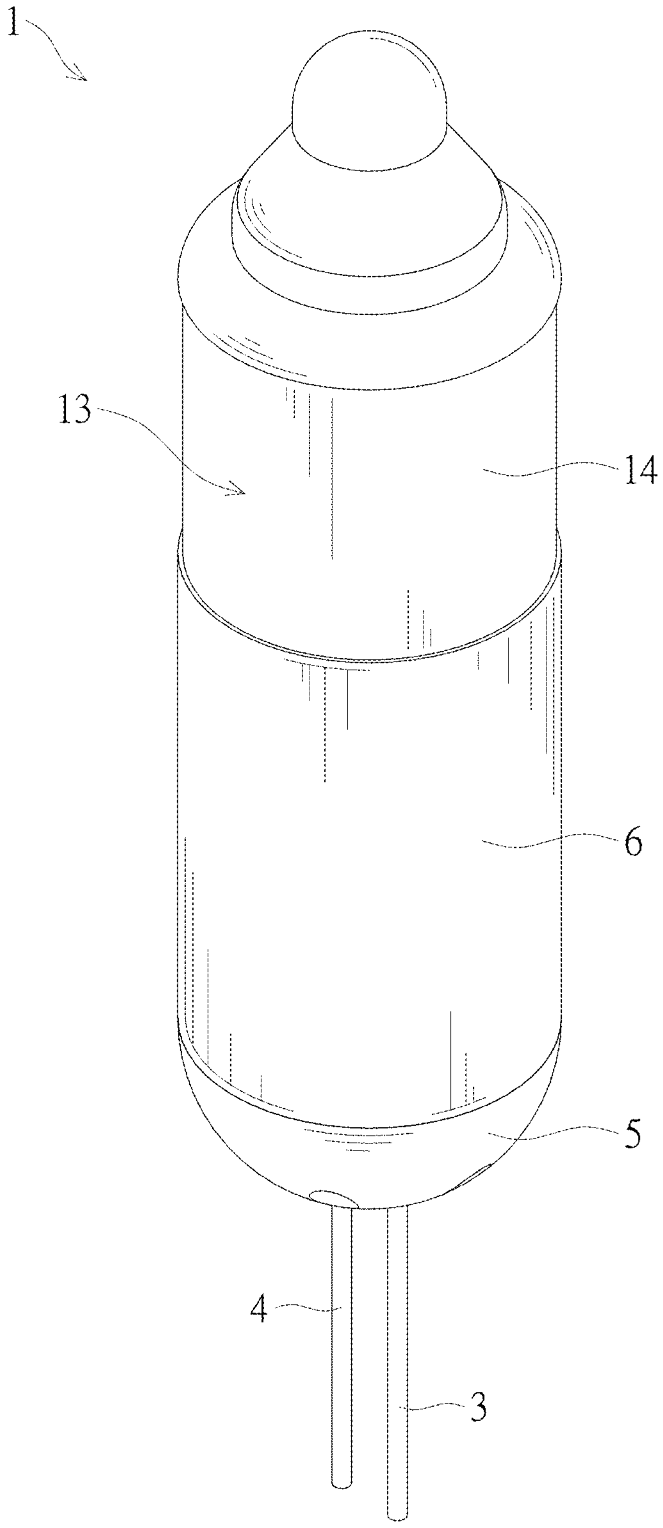
FIG. 1 is an overall appearance view of the present invention.
Figure 2:
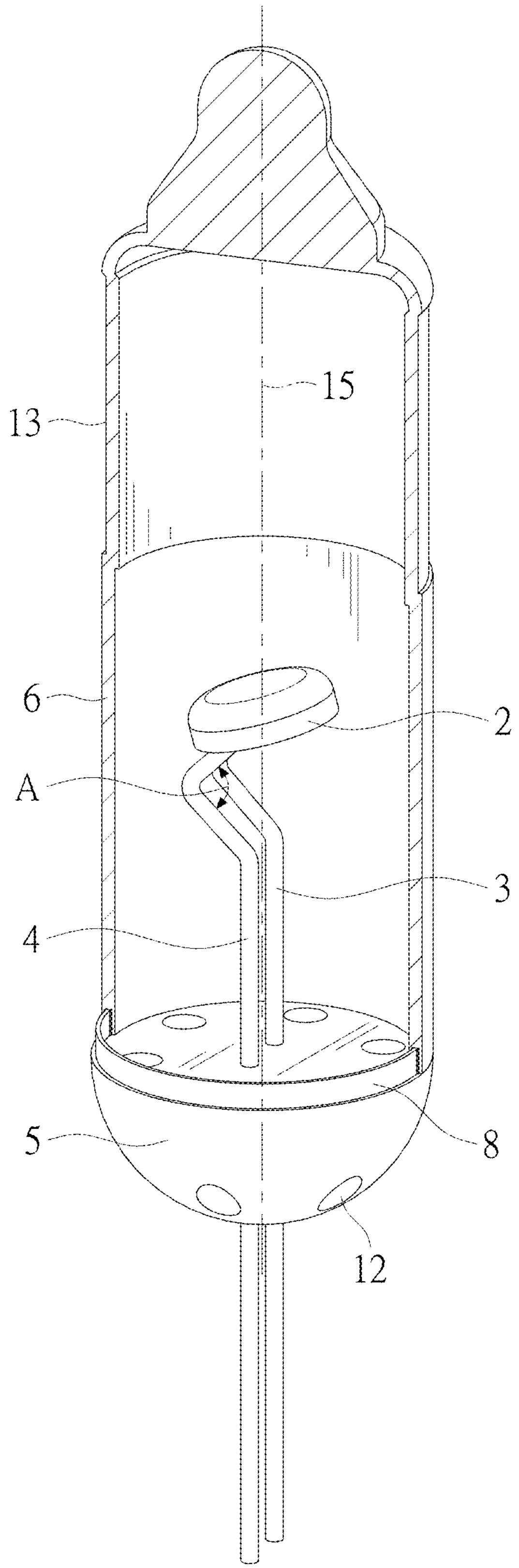
FIG. 2 is a cross-sectional view of a lens of the present invention.
Figure 3:
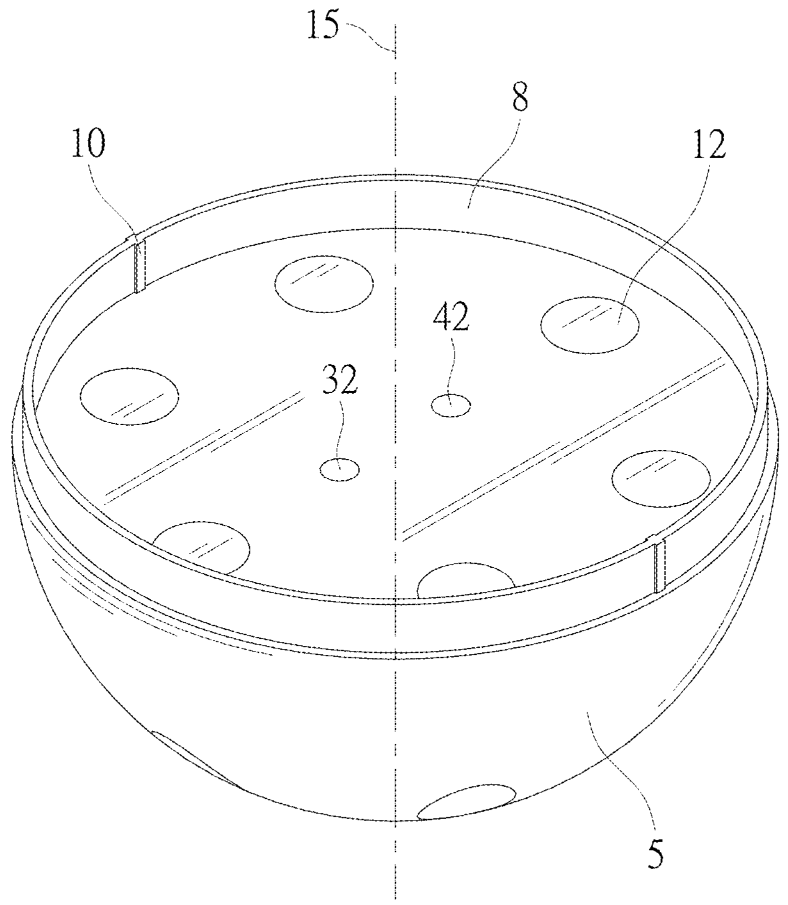
FIG. 3 is a top view of a sealing block of the present invention.
Figure 4:
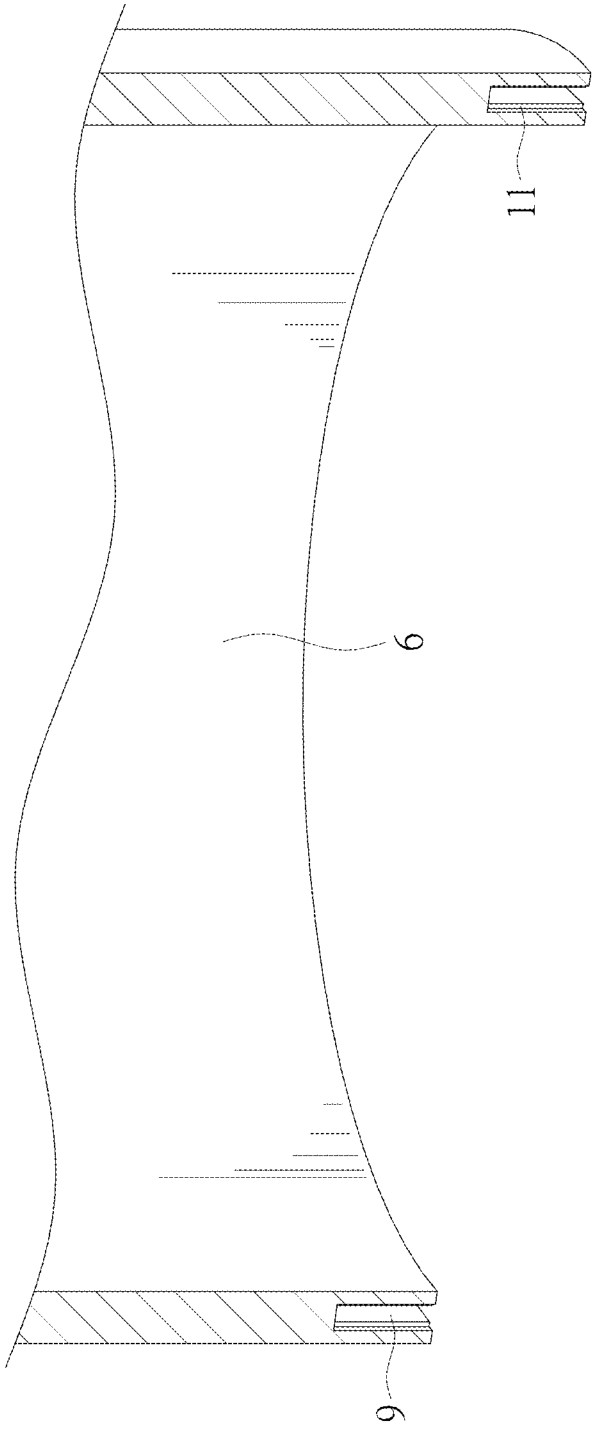
FIG. 4 is another cross-sectional view of a lens of the present invention.
Figure 5:
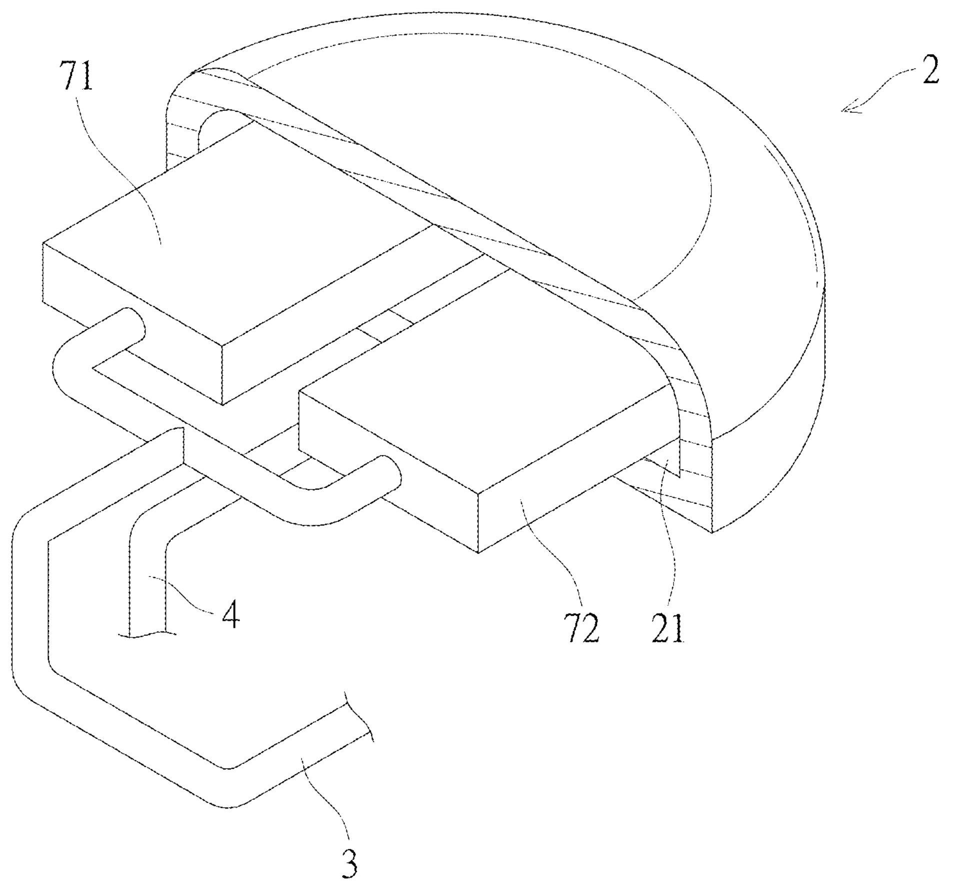
FIG. 5 is a cross-sectional view of an LED light of the present invention.
Figure 6:
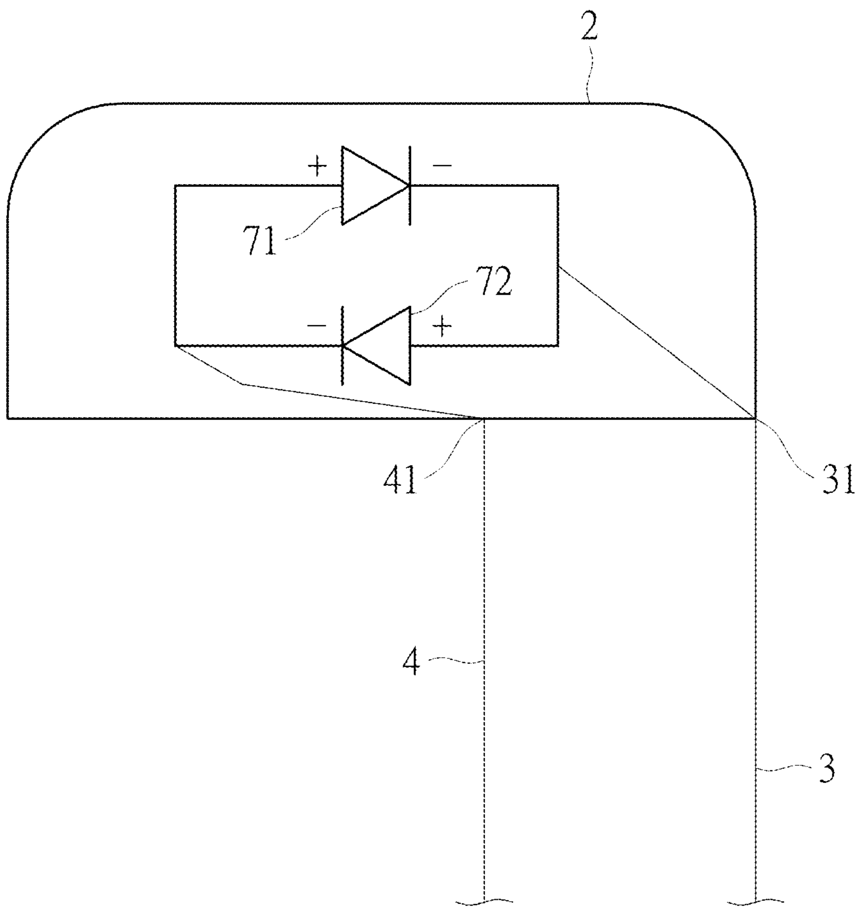
FIG. 6 is a schematic diagram of a connection of two LED chips of the present invention.

Referring to FIGS. 1-6 of the description, the present invention provides a Christmas LED light 1, which includes a lens 6, an LED light 2 disposed inside the lens 6, a positive lead 3 and a negative lead 4 fixedly provided on a bottom surface of the LED light 2; the positive lead 3 and the negative lead 4 each extend beyond the bottom surface of the LED light 2 from a first contact point 31 and a second contact point 41 on the bottom surface of the LED light 2. And a direction of a connection line between the first contact point 31 and the second contact point 41 is perpendicular to a direction of a central axis 15 of the Christmas LED light 1. The bottom end of the lens 6 is fixedly bonded to a sealing block 5. The sealing block 5 has a top and a bottom. The positive lead 3 and the negative lead 4 each penetrate the sealing block 5 from a third contact point 32 and a fourth contact point 42 on the top of the sealing block 5 and reach beyond the bottom of the sealing block 5, wherein the central axis 15 is from a top of the lens 6 to the bottom of the sealing block 5.

The positive lead 3 and the negative lead 4 are each bent to form a bending angle A near the LED light 2, and the LED light 2 illuminates toward a top of the lens 6, and a cavity 21 is provided inside the LED light 2. And a first LED chip 71 and a second LED chip 72 are accommodated in the cavity 21. The first LED chip 71 and the second LED chip 72 are reverse-parallel connected, i.e. the first LED chip 71 and the second LED chip 72 are connected in parallel with opposite polarities. After being connected in parallel, the reverse-parallel connected first LED chip 71 and second LED chip 72 have two terminals each fixedly connected to the positive lead 3 and the negative lead 4. Regardless of the polarity in an external power supply connected to the positive lead 3 and the negative lead 4, one of the first LED chip 71 and the second LED chip 72 emits light. Hence, there is no need to distinguish polarities when assembling the Christmas LED light 1, which greatly reduces the difficulties of assembly and thereby increases the productivity of the Christmas LED light 1.

Preferably, the third contact point 32 and the fourth contact point 42 are symmetrically disposed with respect to the central axis 15 of the Christmas LED light 1, that is, the central axis 15 is a perpendicular bisector of a connection line between the third contact point 32 and the fourth contact point 42. As a result, when assembling the Christmas LED light 1, relative rotation between the sealing block 5 and the lens 6 does not affect the appearance of the emitted light.

The positive lead and the negative lead each are bent to form a bending angle A near the LED light, and the bending angle A is 70 to 85°, so as to support the LED light 2 to be in an inclined position within the lens 6. Accordingly, a light-emitting surface of the LED light 2 is tilted with respect to the top of the lens 6 so that the light-emitting surface of the LED light 2 faces the top of the lens 6; as a result, light emitted by the LED light 2 illuminates toward the top of the lens 6 and uniformly covers a light-emitting surface at the top of the lens 6, and thereby avoiding producing shadows when the LED light 2 irradiates, which may affect the aesthetics.

In one embodiment, when the bending angle A of both the positive lead 3 and the negative lead 4 does not reach 90 degrees, for example, when the positive lead 3 and the negative lead 4 are cylindrical, this will result in a partial blind area of illumination. To decrease the blind area of illumination, a light diffusion layer (not shown in the drawings) can be added on top of the light-emitting surface of the LED light 2 to enhance the light diffusion.

Referring to FIGS. 1-5, a top of the sealing block 5 is fixed with a ring insert 8, and a ring groove 9 matching the ring insert 8 is provided on a bottom end surface of the lens 6. The ring insert 8 is inserted in the groove 9, so as to improve the firmness between the sealing block 5 and the lens 6. In order to prevent the ring insert 8 from rotating in the ring groove 9, on each of two sidewalls of the ring insert 8, a respective limit block 10 is fixed, and on each of two inner sidewalls of the ring groove 9, a respective limit slot 11 matching the limit block 10 is fixed. Since the limit block 10 is in the limit slot 11, the limit blocks 10 and the limit slots 11 are cooperated to prevent the ring insert 8 from rotating.

Moreover, the sealing block 5 is fixedly penetrated through by a plurality of metal thermal blocks 12 from the bottom of the sealing block 5 and into a space inside the lens 6, and the plurality of metal thermal blocks 12 are interspersed with the positive lead 3 and the negative lead 4 so as to conduct heat in the lens 6 to an exterior of the lens 6 to dissipate heat of the LED light 2.

An annular recess 13 is provided at an upper section of an outer wall of the lens 6, and a color paper 14 is attached in the annular recess 13, and a color of the light emitted from the Christmas LED light 1 can be changed by replacing the color paper 14 with a color paper 14 of a different color, and the color paper 14 is glued to attach to the annular recess 13 to facilitate replacing the color paper 14.

With the ring insert 8 on the sealing block 5, an assembly personnel only needs to align and insert the two limit blocks 10 on the ring insert 8 each into the two corresponding limit slots 11 when the sealing block 5 and the lens 6 are assembled. The two limit blocks 10 can effectively prevent the sealing block 5 from rotating. This can ensure that the LED light 2, the positive lead 3 and the negative lead 4 all remain in the same position. And with multiple metal thermal blocks 12 in the sealing block 5, the multiple metal thermal blocks 12 can quickly conduct heat in the lens 6 to the exterior of the lens 6 to realize heat dissipation for the LED light 2. And by attaching the color paper 14 inside the annular recess 13 of the outer wall of the lens 6 by adhesives, the color of the light emitted by the Christmas LED light 1 can be changed according to the color of the color paper 14, so as to enhance the Christmas atmosphere.

Finally: the above are only preferred embodiments of the present invention, and are not intended to limit the present invention. Any modifications, equivalent substitutions, improvements, etc. made within the spirit and principles of the present invention shall be included within the protection scope of the present invention.

The technical principles of the present invention are described above in connection with specific embodiments. These descriptions are only intended to explain the principles of the present invention, and are not to be construed in any way as a limitation on the scope of protection of the present invention. Based on the explanations herein, other specific embodiments of the present invention can be associated by those skilled in the art without creative labor, and these equivalent variations or substitutions are included in the scope limited by the claims of this application.

Although the present invention has been disclosed as above by way of a preferred embodiment, it is not intended to limit the present invention, and any one skilled in the art may make certain changes and modifications without departing from the spirit and scope of the present invention, and therefore the scope of protection of the present invention shall be subject to the scope of the appended patent claims as defined herein.

What is claimed is:

1. A Christmas light-emitting diode (LED) light, comprising a lens having an LED light inside the lens, and the LED light having a positive lead and a negative lead fixed on a bottom surface of the LED light; a sealing block fixedly bonded to a bottom of the lens, and lower ends of the positive lead and the negative lead each penetrating through the sealing block from top to bottom;

the positive lead and the negative lead each bent to form a bending angle near the LED light, and the LED light including a light-emitting surface which illuminates toward a top of the lens;

the LED light having a cavity inside, and the cavity accommodating a first LED chip and a second LED chip inside, wherein the two of the first LED chip and the second LED chip are reverse-parallel connected, and after being reverse-parallel connected, the first LED chip and the second LED chip have two terminals each respectively fixed to the positive lead and the negative lead.

2. The Christmas LED light as claimed in claim 1, further having a central axis from the top of the lens to the bottom of the sealing block, wherein the positive lead and the negative lead each extend beyond the bottom surface of the LED light from a first contact point and a second contact point on the bottom surface of the LED light, and a direction of a connection line between the first contact point and the second contact point is perpendicular to a direction of the central axis of the Christmas LED light.

3. The Christmas LED light as claimed in claim 1, wherein the bending angle (A) of both the positive lead and the negative lead is from 70° to 85°.

4. The Christmas LED light as claimed in claim 1, further having a central axis from the top of the lens to the bottom of the sealing block, wherein, at a top of the sealing block there are a third contact point and a fourth contact point, and the positive lead passes through the third contact point, the negative lead passes through the fourth contact point, and the third contact point and the fourth contact point are symmetrically disposed relative to the central axis.

5. The Christmas LED light as claimed in claim 1, wherein at a top of the sealing block, a ring insert is fixed thereto, and a ring groove matching the ring insert is provided on a bottom end surface of the lens, and the ring insert is inserted in the ring groove.

6. The Christmas LED light as claimed in claim 5, wherein the ring insert is provided with a respective limit block on each of two sidewalls of the ring insert, and the ring groove is provided with a respective limit slot matching the limit block, on each of two inner sidewalls of the ring groove, wherein the limit block is inserted in the limit slot.

7. The Christmas LED light as claimed in claim 1, wherein the sealing block is fixedly penetrated through by a plurality of metal thermal blocks from the bottom of the sealing block and into a space inside the lens, and the plurality of metal thermal blocks are interspersed with the positive lead and the negative lead to conduct heat in the lens to an exterior of the lens for heat dissipation.

8. The Christmas LED light as claimed in claim 1, wherein an annular recess is provided at an upper section of an outer wall of the lens, and a color paper is attached in the annular recess, and a color of the light emitted from the Christmas LED light is changeable by replacing the color paper with a color paper of a different color.

9. The Christmas LED light as claimed in claim 8, wherein the color paper is glued to the annular recess.

10. The Christmas LED light as claimed in claim 1, wherein a light diffusion layer is provided on top of the light-emitting surface of the LED light.

* * * * *